(12) United States Patent
Jirele et al.

(10) Patent No.: US 6,928,739 B2
(45) Date of Patent: Aug. 16, 2005

(54) TOOL FORCE TRANSMITTING METHOD AND APPARATUS

(75) Inventors: James E. Jirele, Owatonna, MN (US); Jose O. Barrios, New Richland, MN (US)

(73) Assignee: SPX Corporation, Charlotte, NC (US)

(*) Notice: Subject to any disclaimer, the term of this patent is extended or adjusted under 35 U.S.C. 154(b) by 82 days.

(21) Appl. No.: 10/465,608

(22) Filed: Jun. 20, 2003

(65) Prior Publication Data

US 2004/0255470 A1 Dec. 23, 2004

(51) Int. Cl.[7] .............................................. B26B 17/00
(52) U.S. Cl. ........................ 30/182; 30/180; 30/272.1
(58) Field of Search ............................. 30/272.1, 180, 30/182, 183; 482/106; 403/52, 53, 55

(56) References Cited

U.S. PATENT DOCUMENTS

| | | | | | |
|---|---|---|---|---|---|
| 990,791 | A | * | 4/1911 | Whitley et al. ............ | 482/106 |
| 4,257,163 | A | * | 3/1981 | Bauer ......................... | 30/180 |
| 4,296,552 | A | * | 10/1981 | Sabatino ..................... | 30/183 |
| 4,641,430 | A | * | 2/1987 | Hahn ........................ | 30/120.5 |
| 4,698,909 | A | * | 10/1987 | Sleigh ........................ | 30/180 |
| 5,479,710 | A | * | 1/1996 | Aston ........................ | 30/182 |
| 5,533,428 | A | * | 7/1996 | Pradelski .................... | 81/179 |
| 6,280,364 | B1 | * | 8/2001 | Deac et al. ................. | 482/106 |
| 2004/0200320 | A1 | * | 10/2004 | Knoop et al. .............. | 81/57.39 |

* cited by examiner

*Primary Examiner*—Hwei-Siu Payer
(74) *Attorney, Agent, or Firm*—Baker & Hostetler LLP

(57) ABSTRACT

A method and apparatus for transmitting a force around a corner is provided. The apparatus includes a force transmitter comprising a first and second rounded end, a connecting member connecting the first and second rounded ends having a smaller diameter than the first and second rounded ends. The method for transmitting a force around a corner comprises the steps of urging a force transmitter in one direction, transmitting the force from the force transmitter and a second direction wherein the force transmitter has two rounded ends and a connecting portion having a lesser diameter than either rounded end.

13 Claims, 2 Drawing Sheets

TOOL FORCE TRANSMITTING METHOD AND APPARATUS

FIELD OF THE INVENTION

The present invention relates generally to a method and apparatus for transmitting a force. More particularly, the present invention relates to a method and apparatus for transmitting a compressive force in a tool from one direction to another direction.

BACKGROUND OF THE INVENTION

Often a force, particularly a compressive force, needs to be transmitted in a different direction than the force is originally provided. For example, a tool, commonly called a nut splitter, is used to facilitate the removal of threaded fasteners such as a nut that has been rendered inoperative by thread damage or corrosion. The damage or corrosion may cause the nut to not be able to be removed from its mating fastener by simply unscrewing the nut. The nut may be removed by grinding or cutting it off with a saw or a torch such as an oxyacetylene torch. However, use of a nut splitter is often desirable where it may cause less damage to the surrounding components than other methods of nut removal.

The common nut splitter may have a C-shaped frame and a pusher that urges the nut to be pushed against the chisel. The pusher and the chisel are supported by the C-shaped frame. The pusher applies a compressive force to the nut and urges it against the chisel where the nut is split and then removed. Some nut splitters use a forcing screw which may be turned by a wrench to provide the force to the pusher to urge the nut against the chisel. The forcing screw may be located in a handle portion of the nut splitter.

In some nut splitters, the handle, and thus the forcing screw, may be canted at an angle with respect to the pusher. Locating the handle at an angle with respect to the C-shaped frame can permit the nut splitter to be used in applications where the nut is located in an awkward position, such as in a tight space. Such types of nut splitters require transmitting the compressive force provided by the forcing screw to be transferred at an angle to the pusher. Because the forcing screw and the pusher are at an angle with respect to each other, the force must be transferred from one direction to another direction.

One technique for transmitting a compressive force from one direction to a second direction in a tool such as a nut splitter is to use two steel balls to transmit the compressive force from a forcing screw to a pusher. The forcing screw and pusher are contained in cylindrical chambers within the handle and frame of the nut splitter, respectively. The chambers are canted with respect to each other. Because the chambers intersect at an angle, a corner protrudes into the space created by the intersection of the chambers. The steel balls contact each other and are located in the space defined by the intersection of the chambers. One ball is seated against the forcing screw the other ball against the pusher. The corner is located between the balls. The force is transmitted from the forcing screw through the balls to the pusher.

One problem associated with the two ball design is that all the force transmitted from one ball to another ball occurs at a single contact point. The single contact point for providing the transfer of force creates a high compressive stress that may cause permanent deformation of one ball or both balls. The high stress may create a flat spot in the one or both balls. A flat spot can reduce the effectiveness of transmitting force between the balls. Alternatively, the high compressive stress can fracture one or both balls. Fracture of one or both balls may render the tool inoperative.

While the example described herein discusses transmitting a force in a nut splitter, there are many other application where transmitting a force in one direction to another direction is desired.

Accordingly, it is desirable to provide a method and apparatus that permits a compressive force to be transmitted from one direction to another direction, that can avoid to some extent the occurrence deforming the members that transfer the force or fracturing the force transmitting members.

SUMMARY OF THE INVENTION

The foregoing needs are met, to some extent, by the present invention, wherein in one aspect a method and apparatus is provided where in some embodiments, a compressive force is transmitted from one direction to another direction, and the occurrence deforming the members that transfer the force or fracturing the force transmitting members is avoided to some extent.

In accordance with one embodiment of the present invention, a force transmitter is provided. The force transmitter comprises a first rounded end and a second rounded end. The force transmitter also includes a connecting member connecting the first and second rounded ends with the connecting member having a smaller diameter than either of the first and second rounded ends.

In accordance with another embodiment of the present invention, a force transmitter is provided. The force transmitter comprises a means for receiving a force, a means for transmitting a force, and a means for connecting the receiving means to the transmitting means.

In accordance with yet another embodiment of the present invention, a method of transmitting a force from one direction to another direction is provided. A method includes the steps of urging a force transmitter in one direction and transmitting the force from the force transmitter in a second direction. The method includes a force transmitter that has two rounded ends and a connecting portion having a less diameter than either rounded end.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 2:
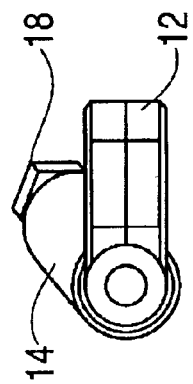
FIG. 2 is a side view of FIG. 1.

The invention will now be described with reference to the drawing figures, in which like reference numerals refer to like parts throughout. An embodiment in accordance with the present invention provides a force transmitter or force transmitting number, for transferring a compressive force from one direction to a second direction, e.g. around a corner. In a preferred embodiment of the invention, the force transmitter is used in a nut splitter tool. However, the nut splitter tool application is meant to be exemplary only and is not limiting as the invention could be used in a variety of applications not related to nut splitters.

Figure 1:
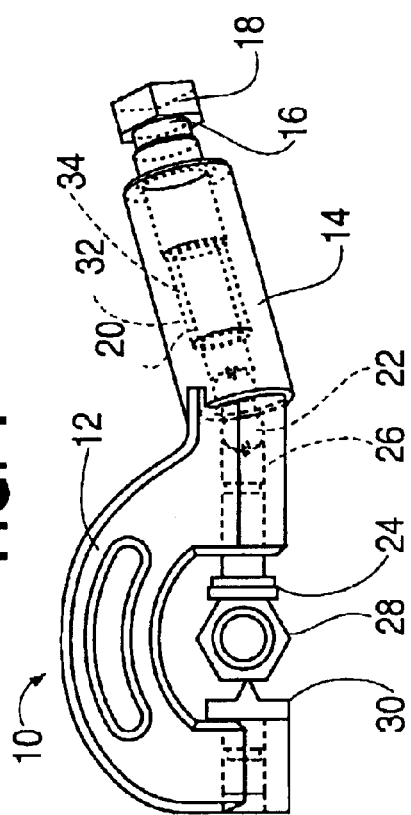
FIG. 1 is an orthogonal view illustrating a nut splitter according to a preferred embodiment of the invention.

An embodiment of the present inventive apparatus is illustrated in FIG. 1. A nut splitter 10 includes a C-shaped body 12 having a handle 14 extending at an angle from the body 12. The handle 14 includes a forcing screw 16 with a bolt head 18 at the end of the forcing screw 16. The majority of the forcing screw 16 is located inside the handle 14 in a chamber 20. The portion of the forcing screw 16 located inside the handle 14 is shown phantom lines in FIG. 1. Also shown in phantom lines is a force transmitter 22 which has one end butting against the forcing screw 16 and the other end butting against a pusher 24. The pusher 24 also is partially located in a chamber 26 within the nut splitter body 12. The other end of the pusher 24 is shown urging a nut 28 against a chisel 30 and is located outside the chamber 26.

The nut splitter 10 operates as follows: the bolt head 18 is turned by an appropriately sized wrench. The forcing screw 16 travels inward into the handle 14, due to the interaction of threads 32 located on the forcing screw 16 and threads 34 located inside the handle 14. The inward movement of the forcing screw 16 urges the force transmitter 22 to urge against the pusher 24. The pusher 24 pushes the nut 28 against the chisel 30. As the nut 28 continues to urge against the chisel 30, at some point the chisel 30 will cause the nut 28 to split. Once the nut 28 is split, the forcing screw 16 can be loosened by turning the bolt head 18 in the opposite direction. Then the pusher 24 will release the nut 28 from the chisel 30 and the nut splitter 10 can be removed from the nut 28.

FIG. 2 illustrates a side view of the nut splitter 10 shown in FIG. 1. In FIG. 2 the C-shaped body 12 and the handle 14 and the bolt head 18 are shown.

Figure 3:
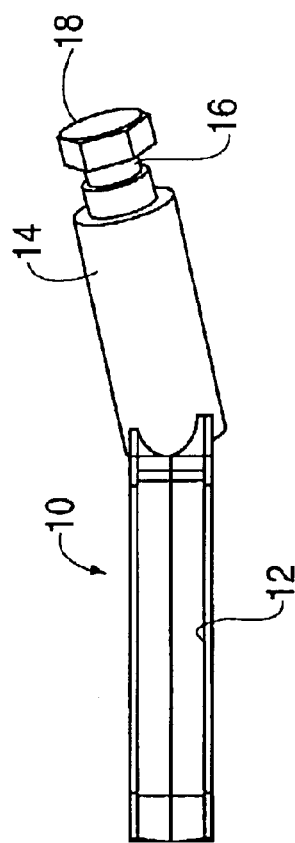
FIG. 3 is a top view of FIG. 1.

FIG. 3 is a top view of the nut splitter 10 shown in FIG. 1. The C-shaped body 12 is shown with the handle 14, the forcing screw 16 capped with the bolt head 18.

Figure 4:
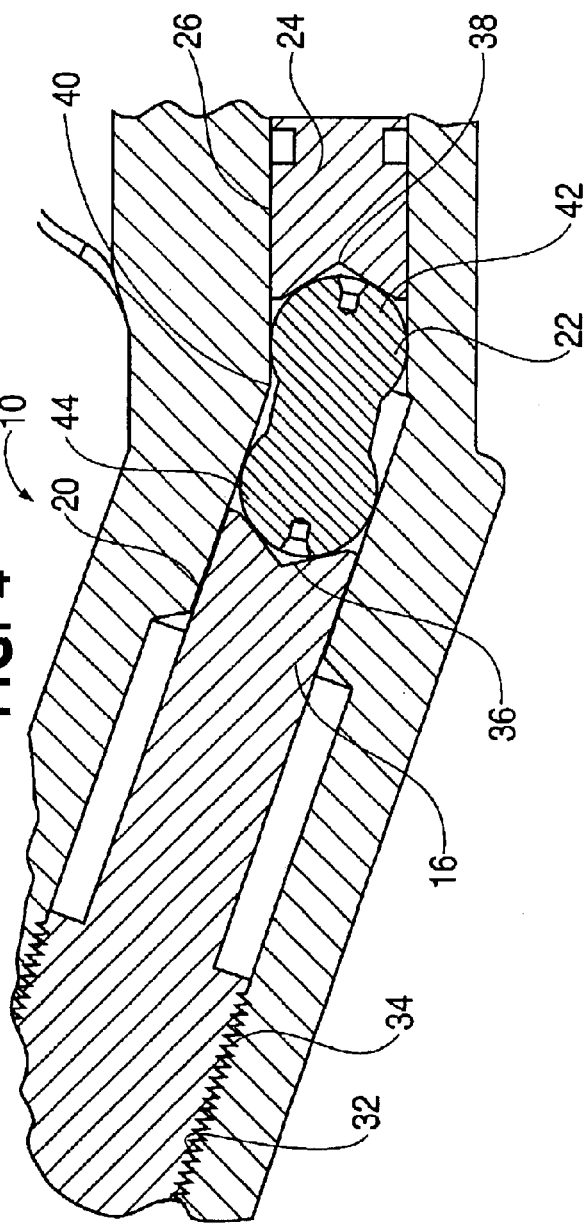
FIG. 4 is a cross sectional view of the nut splitter illustrated in FIGS. 1–3 illustrating the force transmitter connecting the forcing screw and the pusher.

FIG. 4 is a cutaway cross sectional view of the nut splitter 10. The forcing screw 16 is shown pressed against one end of the force transmitter 22. The other end of the force transmitter 22 is butted against the pusher 24. The forcing screw 16 has an end 36 which in the view shown in FIG. 4 appears to be a V-shaped end. However, it is actually cone shaped with the point of contact between the end 36 and the force transmitter 22 being defined by a ring. The end 38 of the pusher 24 is similar in shape to the end 36 of the forcing screw 16. In the embodiment shown in FIG. 4, the end 38 of the pusher 24 is a cone.

Other embodiments of the invention may include ends 36 and 38 having shapes other than cones. For example, concave spherical shapes and other shapes may be used.

The preferred embodiment shown in the FIGS. includes a forcing screw 16 urging a force transmitter 22 against a pusher 24 around a corner 40. The corner 40 occurs as a result of the chambers 20 and 26 housing the forcing screw 16 and the pusher 24 being at an angle with respect to each other. The corner 40 is positioned between the two ends 42 and 44 of the force transmitter 22.

Other embodiments of the invention may include other force generating elements than a forcing screw 16. For example, hydraulic or pneumatic cylinders and pistons could be used. The force transmitter 22 can be used in a variety of applications not related to nut splitters. The invention may be used whenever two members located in angles with respect to each other need to have force transmitted between them. Particularly, in situations where the force must be transmitted around the corner as shown in detail in FIG. 4.

The force transmitter can be used even when the members are coaxial with each other or in other words, located at 180° with respect to each other.

Figure 5:
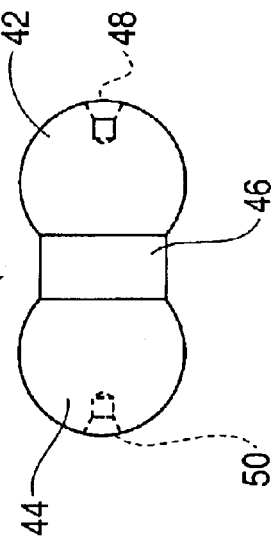
FIG. 5 is a side view of a force transmitter according to one embodiment of the present invention.

FIG. 5 is a side view of a force transmitter 22. A right hand end 42 and a left hand end 44 in the embodiment shown in FIG. 5 are symmetrical. Other embodiments of the invention may include non-symmetrical ends. The two ends 42 and 44 comprise a rounded spherical shaped ends connected by connecting member 46.

The connecting member 46 has a round cross sectional diameter which is smaller than the diameter of the ends 42 and 44. The cross sectional diameter of the connecting member 46 is sized such that when placed in its intended application, that the connecting member 46 does not bind against the corner 40. The sizing of the connecting member 46 is related to the angle which the chambers 20 and 26 intersect. One skilled in the art would know how to appropriately size the connecting member 46 to not cause the connecting member 46 to bind against a corner 40 in the application for which the force transmitter 22 is intended.

In the embodiment shown in the FIGS., the cross section of the connecting member 46 is circular. Other cross sectional shapes may be used. For example, the connecting member 46 may have a square, triangle or other cross-sectional shape.

The connecting member 46 connects the two ends 42 and 44. The connecting member 46 provides a larger area for force to be transmitted from one end to the other. Thus, using the connecting member 46 reduces some of the problems caused by a two ball system of transferring force.

In some embodiments of the present invention, the force transmitter 22 may rotate as the forcing screw 16 rotates against the force transmitter 22. In other embodiments of the invention frictional forces acting on the force transmitter 22 prevent the force transmitter 22 from rotating when the forcing screw 16 rotates against the force transmitter 22. In embodiments where some other device than a forcing screw 16 transmits force to the force transmitter 22 the other device not rotate against the force transmitter 22. The description herein of a rotating member transmitting force to the force transmitter 22 is meant to be exemplary and not limiting.

Figure 6:
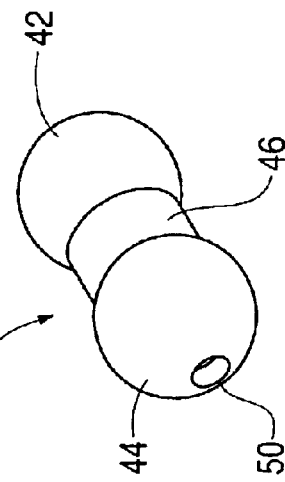
FIG. 6 is a perspective view of a force transmitter according to one embodiment of the present invention.

As shown in FIGS. 4–6, certain embodiments of the force transmitter 22 include holes 48 and 50 in the ends 42 and 44. The holes 48 and 50 are an optional feature and may provide ease in manufacturing the force transmitter 22. The holes 48 and 50 may ease mounting the force transmitter 22 on a lathe or other machine.

FIG. 6 is a perspective view of the force transmitter 22 illustrating the two ends 42 and 38 the connecting member 46 and an optional hole 50.

In some embodiments of the present invention, the force transmitter 22 is made of metal. For example, the force transmitter 22 may be made of tool steel such as 01 tool steel. The force transmitter 22 may be heat treated. For example, the force transmitter 22 may be treated with Rc 58–62 heat treat. Other embodiments of the invention may include case hardening the force transmitter 22. Some embodiments of the invention may include finishing the force transmitter 22 with an oil coating. Other embodiments may include a polished finish on the force transmitter 22.

Although an example of the force transmitter 22 is shown in a nut splitter, it will be appreciated that in other applications the force transmitter can be used. Virtually any similar application where a force needs to be transmitted the invention may be applied.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A nut splitter comprising:
   a force transmitter having a first rounded end, a second rounded end, and a connecting member connecting the first and second rounded ends, said connecting member having a smaller diameter than the first and second rounded ends;
   a C shaped body having a handle extending from the body;
   a chisel attached to the body;
   a pusher configured to urge a nut against the chisel; and
   a forcing screw attached to the handle via threads and configured to transmit a force to the pusher via the force transmitter.

2. The nut splitter of claim 1, wherein the first and second rounded ends are each substantially spherically shaped.

3. The nut splitter of claim 1, wherein the connecting member is substantially cylindrically shaped.

4. The nut splitter of claim 1, wherein the first and second rounded ends and the connecting member form a single integral part.

5. The nut splitter of claim 1, wherein the force transmitter is comprised of tool steel.

6. The nut splitter of claim 1, wherein at least one of the first and second ends contain a hole.

7. The nut splitter of claim 1, wherein an axis associated with the forcing screw and an axis associated with the pusher are at an angle with respect to each other.

8. A system for splitting a nut comprising:
   a force transmitter having means for receiving a force, means for transmitting a force, and means for connecting the receiving means to the transmitting means;
   a C shaped body having a handle extending from the body;
   means attached to the body for splitting the nut;
   means for pushing the nut against the splitting means; and
   means for inducing a force to the pushing means via the force transmitter.

9. The system of claim 8, wherein an axis associated with the force transmitter and an axis associated with the pushing means are at an angle with respect to each other.

10. The system of claim 8, wherein the splitting means comprises a chisel.

11. The system of claim 8, wherein the inducing means comprises a forcing screw.

12. The system of claim 11, wherein the force receiving means receives a force from the forcing screw.

13. A tool comprising:
   a body having a first bore and a second bore at an angle to the first bore;
   a forcing screw movably disposed in the first bore;
   a pusher movably disposed in the second bore;
   a member having a first and a second end, with each end having a respective partially spherical end surface, wherein the two ends are rigidly connected to each other and a force applied to one end by contact from the forcing screw is transmitted to the pusher by contact of the other end to the pusher.

* * * * *